Patented June 6, 1939

2,161,038

UNITED STATES PATENT OFFICE 2,161,038

MANUFACTURE OF RUBBERLIKE POLYMERIZATION PRODUCTS

Bernard James Habgood, Rowland Hill, and Leslie Budworth Morgan, Blackley, Manchester, England, assignors to Imperial Chemical Industries Limited, a corporation of Great Britain No Drawing. Application June 3, 1937, Serial No. 146,312. In Great Britain June 4, 1936

16 Claims. (Cl. 260—84)

This invention relates to synthetic rubber-like materials.

The object of this invention is to produce new synthetic rubber-like materials. A further object is to provide methods of manufacturing new synthetic rubber-like materials. A further object is to produce new compounded products of these new synthetic rubber-like materials. A further object is to provide methods of compounding such new synthetic rubber-like materials to give new products. Further objects will appear hereinafter.

These objects are accomplished by the following invention. We have found that we can make new synthetic materials possessing valuable rubber-like properties, by the process which comprises interpolymerizing in aqueous emulsion a mixture of butadiene with not more than half its weight of a methacrylic ester of the formula

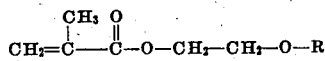

wherein R stands for, either an alkyl radical containing not more than 4 carbon atoms, or a phenyl, tolyl or xylyl radical.

The alkyl radical may be methyl, ethyl, propyl, or isopropyl, butyl, isobutyl or tert. butyl. The tolyl and xylyl radicals may be any of the various isomers coming under these names.

The alkyl methacrylic esters may be made by the processes of British Specification Nos. 405,699, 424,885 and 427,810; the aryl methacrylic esters may be made by esterifying methacrylic acid with the corresponding monoaryl ethers of ethylene glycol.

While amounts of methacrylic ester up to one-half that of the butadiene may be employed as already stated, amounts of between 25 and 40% of the butadiene give the products in which the rubber-like properties are the most pronounced.

The aqueous emulsion for polymerization may be obtained, for example, by passing the requisite quantity of butadiene gas or cooled butadiene liquid into a mixture of water or ice, and the ester, and other necessary ingredients in a closed vessel, and agitating. The emulsification and interpolymerization can be conveniently effected in what may be regarded as a single technical operation, if the ingredients of the mixture are emulsified by agitating at the temperature at which interpolymerization is to be effected, and agitation then continued sufficiently long for the necessary interpolymerization process to take place. Suitable emulsifying agents are salts of bases of high molecular weight and organic or inorganic acids, such as diethylaminoethyloleylamide acetate or hydrochloride, cetyltrimethylammonium methyl sulphate, dimethylcetylsulphonium methyl sulphate and cetylpiperidinium methyl sulphate.

Small proportions of one or more suitable electrolytes, e. g. acetic acid or acetic acid admixed with sodium acetate, may be conveniently included in the mixtures. Small proportions of substances yielding oxygen, e. g. hydrogen peroxide, and of chlorinated hydrocarbons, e. g. carbon tetrachloride may be also included as catalysts. The aforementioned substances have the general effect of either increasing the total yield of rubber-like product, or of increasing the rate of its formation, or both, and they may in addition, improve the physical properties of the product.

The interpolymerization products are produced in latex-like form. They may be obtained in massive form by coagulating the latex, separating the coagulum, washing and drying. The coagulation may be effected by adding ethyl alcohol to the latex or by using one of the other processes already known for this purpose. Washing and drying may be effected on heated rollers, provided with a water-spray device.

The interpolymerization products may be mixed with compounding ingredients including carbon blacks, and vulcanized to give products resembling vulcanized natural rubber and having excellent mechanical and physical properties, and the invention includes this compounding and vulcanizing. In general, these synthetic rubber-like materials, after washing and drying, are obtained in the form of elastic sheets, resembling crepe rubber, which can be compounded in a manner similar to that employed with natural rubber on standard rubber processing machinery. The materials after compounding with carbon black and vulcanizing give products which closely resemble vulcanized natural rubber, but have certain advantages, such as increased resistance to heat, light, and certain solvents such as pyridine. Natural rubber or other synthetic rubber-like materials may be used in conjunction with the interpolymerization products.

The following examples, in which the parts are by weight, illustrate but do not limit the invention.

*Example 1.*—30 parts of butadiene, 15 parts of β-ethoxyethyl methacrylate, 60 parts of a 2% aqueous solution of trimethylcetylammonium methyl sulphate and 3.5 parts of 6% acetic acid are mixed together and the mixture agitated for 5 days at 60° C. The resulting latex-like product is coagulated by the addition of ethyl alcohol. The coagulum is separated, washed free from soluble salts on a roller mill, provided with a spray and then dried. A rubber-like product is obtained in nearly quantitative yield.

The product is compounded as follows:

| | Parts |
|---|---|
| Interpolymerization product | 100 |
| Channel black | 50 |
| Stearic acid | 2 |
| Zinc oxide | 10 |
| Tricresyl phosphate | 20 |
| Sulphur | 2 |
| Mercaptobenzo-thiazol | 1 |

This compounded stock after vulcanizing for 1 hour at 141° C. gives a "snappy" rubber which, when tested by the Shore Elastometer, shows a hardness of 70° and an elasticity of 68%.

*Example 2.*—30 parts of butadiene, 14 parts of β-methoxyethyl methacrylate, 60 parts of a 2% aqueous solution of trimethylcetylammonium methyl sulphate and 3.5 parts of 6% acetic acid are mixed together and heated at 60° C. with agitation for 5 days and the interpolymerization product then isolated as in Example 1. The product is obtained in almost quantitative yield, and is similar to that of Example 1.

After compounding and vulcanizing as described in Example 1, a very similar product is obtained.

*Example 3.*—100 parts of β-ethoxyethyl methacrylate, 216 parts of butadiene, 600 parts of a 2% aqueous solution of diethylaminoethyl-oleylamide acetate, 35 parts of 6% acetic acid, 80 parts of carbon tetrachloride and 30 parts of 0.6% hydrogen peroxide are mixed together and heated up to 60° C. with agitation for 1 day, and the interpolymerization product isolated as in Example 1. The product is obtained in about 70% yield.

It is compounded as follows:

| | Parts |
|---|---|
| Interpolymerization product | 100 |
| Channel black | 50 |
| Stearic acid | 2 |
| Zinc oxide | 10 |
| Sulphur | 2 |
| Mercaptobenzo-thiazol | 1 |

The material after vulcanizing for 1 hour at 141° C. gives a rubber-like product having a hardness of 65° and an elasticity of 64%.

*Example 4.*—14 parts of β-ethoxyethyl methacrylate, 30 parts of butadiene, 60 parts of a 2% aqueous solution of diethylaminoethyloleylamide acetate, 3.5 parts of 6% acetic acid and 8 parts of carbon tetrachloride are mixed together and heated at 60° C. with agitation for four and a half days, and the product then isolated as in Example 1. The yield is almost quantitative.

The product is compounded as in Example 3 and after vulcanizing for 1 hour at 141° C. gives a rubber-like product of hardness 71°, elasticity 57% and a tensile strength at break of 178 kg./cm.

*Example 5.*—13 parts of β-methoxyethyl methacrylate, 28 parts of butadiene, 60 parts of a 2% aqueous solution of trimethylcetylammonium methyl sulphate, 3.5 parts of 6% acetic acid and 8 parts of carbon tetrachloride are mixed and emulsification, interpolymerization and isolation effected as in Example 3. An almost theoretical yield of polymerization product is obtained.

After compounding and vulcanizing as in Example 3 a rubber-like product is obtained having a hardness of 72°, an elasticity of 58% and a tensile strength at break of 187 kg./cm.

*Example 6.*—15 parts of β-phenoxyethyl methacrylate, a new compound, B. P. 152–6° C./13 mm. made by esterifying methacrylic acid with ethylene glycol monophenyl ether, 35 parts of butadiene, 60 parts of a 2% aqueous solution of trimethylcetylammonium methyl sulphate, and 3.5 parts of 6% acetic acid, are mixed and emulsification, interpolymerization and isolation effected as in Example 3, except that the polymerization treatment is extended to 7 days.

After compounding and vulcanizing as in Example 3 a rubber-like product is obtained having a hardness of 80° and an elasticity of 46%. When compounded and vulcanized according to Example 1 a more elastic product is obtained.

This invention is a valuable advance in the art, as it extends the range of known rubber substitutes, giving new substitutes for rubber which have in many respects advantages over rubber.

As many apparently widely different embodiments of this invention may be made without departing from the spirit and scope thereof, it is to be understood that we do not limit ourselves to the specific embodiments thereof except as defined in the appended claims.

We claim:

1. Process for the manufacture of new synthetic rubber-like materials, which comprises interpolymerizing in aqueous emulsion a mixture of butadiene with not more than half its weight of a methacrylic ester of the formula

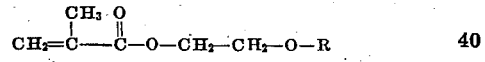

wherein R stands for a hydrocarbon radical of the group consisting of alkyl radicals containing less than 5 carbon atoms, phenyl radicals, tolyl radicals, and xylyl radicals.

2. Process as claimed in claim 1, in which a small proportion of acetic acid is added to the mixture prior to the interpolymerization.

3. Process as claimed in claim 1, in which the aqueous emulsion contains an emulsifying agent which is a salt of an organic base of high molecular weight.

4. Process as claimed in claim 1 in which dimethylaminoethyloleylamide acetate is present in the aqueous emulsion.

5. Process as claimed in claim 1 in which trimethylcetylammonium methyl sulfate is present in the aqueous emulsion.

6. Process as claimed in claim 1 in which a small proportion of a substance yielding oxygen is employed as a catalyst.

7. Process as claimed in claim 1 in which the interpolymerization is assisted by adding a chlorinated hydrocarbon solvent to the mixture.

8. A synthetic rubber-like material obtained by the process of claim 1.

9. Process which comprises compounding and vulcanizing a synthetic rubber-like material obtained by the process of claim 1.

10. As new products, synthetic rubber-like materials obtained by the process of claim 1 which have been thereafter compounded and vulcanized.

11. The process of claim 1, further characterized in that the methacrylic ester is present in an amount ranging from 25% to 45% by weight of the butadiene.

12. Process as claimed in claim 1 in which the aqueous emulsion contains an emulsifying agent which is a salt of the group consisting of long chain tertiary sulfonium salts and long chain quaternary ammonium salts.

13. Process for the manufacture of new synthetic rubber-like materials which comprises interpolymerizing a mixture of butadiene with about half its weight of betaethoxyethyl methacrylate while the two are emulsified in a quantity of a 2% aqueous solution of trimethylcetylammonium methyl sulfate equal to about twice the weight of the butadiene, said emulsion also containing a quantity of 6% acetic acid equal to about 11½% of the weight of the butadiene, said interpolymerization being continued for about five days at about 60° C. with agitation of the dispersion and thereafter separating, washing, and drying the coagulum.

14. Process for the manufacture of new synthetic rubber-like materials which comprises interpolymerizing a mixture of butadiene with about 46½% of its weight of betamethoxyethyl methacrylate while the two are emulsified in a quantity of a 2% aqueous solution of trimethylcetylammonium methyl sulfate equal to about 2½ times the weight of the butadiene, said emulsion also containing a quantity of 6% acetic acid equal to about 12½% of the weight of the butadiene and a quantity of carbon tetrachloride equal to about $\frac{3}{10}$ the weight of the butadiene and said interpolymerization being continued for one day at about 60° C. with agitation of the dispersion and thereafter separating, washing, and drying the coagulum.

15. Process as claimed in claim 1 in which the methacrylic ester is betamethoxyethyl methacrylate.

16. Process as claimed in claim 1 in which the methacrylic ester is betaethoxyethyl methacrylate.

BERNARD JAMES HABGOOD.
ROWLAND HILL.
LESLIE BUDWORTH MORGAN.